(12) United States Patent
Lee et al.

(10) Patent No.: US 8,277,950 B2
(45) Date of Patent: Oct. 2, 2012

(54) RETARDATION FILM HAVING UNIFORM IN-PLANE PHASE-DIFFERENCE VALUE AND LAMINATED OPTICAL FILM HAVING POSITIVE DISPERSIBILITY IN WAVELENGTH

(75) Inventors: Ho Young Lee, Cheonan-si (KR); Ju Han Kim, Cheonan-si (KR); Young Joong Kim, Cheonan-si (KR); Byung Woo Kim, Cheonan-si (KR); Ki Sung Ju, Cheonan-si (KR)

(73) Assignee: Hwaseung Industries Co. Ltd (KR)

( * ) Notice: Subject to any disclaimer, the term of this patent is extended or adjusted under 35 U.S.C. 154(b) by 556 days.

(21) Appl. No.: 12/483,280

(22) Filed: Jun. 12, 2009

(65) Prior Publication Data

US 2009/0312514 A1 Dec. 17, 2009

(30) Foreign Application Priority Data

Jun. 12, 2008 (KR) ........................ 10-2008-0055062

(51) Int. Cl.
*B32B 27/00* (2006.01)
(52) U.S. Cl. ........................ 428/500; 428/323
(58) Field of Classification Search .................. None
See application file for complete search history.

(56) References Cited

U.S. PATENT DOCUMENTS

| | | | |
|---|---|---|---|
| 7,744,969 B2 | 6/2010 | Hino et al. | |
| 2007/0202273 A1* | 8/2007 | Hirai et al. | 428/1.31 |
| 2009/0066888 A1* | 3/2009 | Kunai et al. | 349/96 |
| 2009/0239001 A1 | 9/2009 | Heki | |

FOREIGN PATENT DOCUMENTS

| | | |
|---|---|---|
| CN | 101612789 | 12/2009 |
| JP | 197811228 | 2/1978 |
| JP | 199425439 | 2/1994 |
| JP | 2000111728 | 4/2000 |
| JP | 2007286615 | 11/2007 |
| JP | 2007-316603 | 12/2007 |
| JP | 2007-321084 | 12/2007 |
| JP | 2007-333846 | 12/2007 |
| JP | 2009301036 | 12/2009 |
| KR | 19960022755 | 7/1996 |
| KR | 20020049854 | 6/2002 |
| KR | 20090129010 | 12/2009 |
| KR | 100953265 | 4/2010 |
| WO | WO2007108562 | 9/2007 |
| WO | WO2008010360 | 1/2008 |

OTHER PUBLICATIONS

A Machine translation of Japanese Publication JP2007-316603 cited in priority Korean application 10-2008-0055062 (relative to U.S. Appl. No. 12/483,280).
A Machine translation of Japanese Publication JP2007-333846 cited in priority Korean application 10-2008-0055062 (relative to U.S. Appl. 12/483,280).
A Machine translation of Japanese Publication JP2007-321084 cited in priority Korean application 10-2008-0055062 (relative to U.S. Appl. 12/483,280).
US patent 7744969 (issued Jun. 29, 2010 Inventor Hino et al.; published US as US2009227756) an English translation or equivalent of WO2007/108562.
US Publication 20090239001 (published Sep. 24, 2009; Inventor Heki; an English translation or equivalent of WO2008010360.
JP199425429—An abstract and machine translation for JP publication JP1994-25429; published Feb. 1, 1994; Inventor Lesca et al; Applicant Himont Inc.
KR2008-55062—(corresponding to U.S. Appl. No. 12/483,280) A KR Office Action dated Feb. 14, 2010 for KR application 10-2008-0055062; Inventor Lee et al.; Applicant Hwaseung Ind Co: (Rea. Apr. 8, 2010 as KR100953265).
KR2002-49854_An abstract for KR Publication KR2002-49854 (Application 1020000079159 filed Dec. 20, 2000); published Jun. 6, 2002; Inventor Choi et al.; Applicant Samsung General Chemicals, Co., Ltd.
JP2009140420 (corresponding to U.S. Appl. No. 12/483,280)—JP Office Action for JP2009140420 dated Oct. 5, 2010; ; Inventor Lee et al.; Applicant Hwaseung Ind Co; (Pub Dec. 24, 2009 as JP2009301036).
JP2009140420-Abstract (Pub JP2009301036) (corresponding to U.S. Appl. No. 12/483,280).
JP2007286615—An abstract and machine translation for JP publication JP2007-286615 (application JP 2007-074382 filed Mar. 22, 2007); published Nov. 11, 2007; Inventor Hino et al.; Applicant Sumitomo Chemical Co.
CN200910149037 (corresponding to U.S. Appl. No. 12/483,280) _An abstract for CN application CN200910149037 (published as CN101612789 Dec. 30, 2012).
CN200910149037.X-Office Action (corresponding to U.S. Appl. 12/483,280).
JP2000111728—An abstract and machine translation for JP publication JP2000111728; published Apr. 21, 2000; (application JP11-291509 filed May 16, 1995)Inventor Wakita et al.; Applicant Matsushita Electric.
JP2009301036—An abstract for JP2009301036 (published Dec. 24, 2009; application JPJP20090140420 filed Jun. 11, 2009; Inventor Lee et al. )which corresponds to U.S. Appl. No. 12/483,280.
WO2007108562—An abstract for WO2007108562 published Sep. 27, 2007 (PCT/JP2007/057009 filed Mar. 23, 2007; Applicant Sumitomo Chemical Company).

* cited by examiner

*Primary Examiner* — Sheeba Ahmed (57) ABSTRACT

The present invention relates to a retardation film having a zero wavelength dispersibility and a uniform retardation, and an optical laminated film having a positive wavelength dispersibility. Here, in the retardation film, a homo polypropylene resin has an isotactic index more than 85 percent and having, and a value subtracting an average in-plane retardation value of the retardation film from the in-plane retardation value at the retardation film is in a range of ±5 nm. In the optical laminated film, another retardation film having a negative wavelength dispersibility is laminated on the above retardation film having a zero wavelength dispersibility.

6 Claims, 3 Drawing Sheets

RETARDATION FILM HAVING UNIFORM IN-PLANE PHASE-DIFFERENCE VALUE AND LAMINATED OPTICAL FILM HAVING POSITIVE DISPERSIBILITY IN WAVELENGTH

CROSS-REFERENCE TO RELATED APPLICATIONS

This application claims priority from Korean patent application number 10-2008-0055062, filed on Jun. 12, 2008, which is hereby incorporated by reference in its entirety.

BACKGROUND OF THE INVENTION

1. Field of the Invention

The present invention relates to an optical film made from a homo polypropylene resin and particularly, to a retardation film having a zero wavelength dispersibiliy and a uniform in-plane retardation value, and a laminated optical film having a positive wavelength dispersibility. More particularly, the present invention relates to a retardation film having a zero wavelength dispersibility having a uniform in-plane retardation value and enhanced durability, and a laminated optical film having positive wavelength dispersibility which substantially matches theoretical broadband values in the whole wavelength of a visible region.

2. Description of the Related Art

A retardation film is made from a material of various polymerized or copolymerized polymeric resins according to target optical characteristics.

A polypropylene resin is typically categorized, based on types of copolymer polymerized therewith, into a homo polymer, a random copolymer, and a block copolymer. The polypropylene resin is classified as an isotactic resin, a syndiotactic resin or an atactic resin, based on stereo regularity of molecular chains in the polypropylene resin. In the conventional technology of manufacturing optically anisotropic films by using the polypropylene resin, a random copolymer and a block copolymer being amorphous or low crystalline that has no stereo regularity or has a very low stereo regularity, such as an ethylene-propylene copolymer resin, is widely used because control of a transparent characteristic and an optical anisotropic characteristic as resin material is relatively easy.

However, when the ethylene-propylene copolymer resin is used as a resin material, a mechanical property, such as stiffness or tensile strength, are low because of amorphousness or low crystallinity of the copolymer resin. Accordingly, when the ethylene-propylene copolymer resin is applied to a manufacturing process, the manufactured film becomes thick, and thus the manufactured film has a low transparency. Furthermore, since the ethylene-propylene copolymer resin has a low melting point, the heat resistance of the manufactured film is inferior when the film is used at a high temperature or is continuously used. In addition, the ethylene-propylene copolymer resin has a low molecular weight in comparison with the homo polypropylene resin of a propylene homo polymer. Thus, the manufactured film has a high melt flow rate (MFR). In addition, the manufactured film fails to have a desirable optical anisotropy because molecular orientation by mechanical stretching is not easy (e.g., the film is broken when a stretching ratio (draw ratio) gets high or stretching (drawing) speed gets fast). For these reasons, commercialization is difficult because it is not suitable for mass production and high-speed production. As a result, a broadband retardation film is required that can have a predetermined retardation value over the whole wavelength of a visible region (400 nm to 800 nm), when the film is used for reflective or transflective liquid crystal display devices suitable for new uses, such as display devices for mobile and outdoor advertisements, and optical pick-up parts for an optical disk. For instance, to exhibit a broadband retardation having a uniform retardation value (e.g., $\lambda/4$) for transmitted light, an optical film is required in which the retardation value increases as the wavelength of the transmitted light increases.

SUMMARY OF THE INVENTION

According to one aspect of the present invention, there is provided a retardation film having a uniform in-plane retardation value and a zero wavelength dispersibility. The retardation film includes a homo polypropylene resin having an isotactic index more than 85 percent and has a zero wavelength dispersibility. A value obtained by subtracting an average in-plane retardation value of the retardation film from the in-plane retardation value at the retardation film is in a range of ±5 nm.

According to another aspect of the present invention, there is provided a laminated optical film having a positive wavelength dispersibility to achieve a broadband retardation having a uniform retardation value (e.g., $\lambda/4$) in the entire wavelength of the visible region, i.e., (400 nm to 800 nm). In the laminated optical film, another retardation film having a negative wavelength dispersibility is laminated on the retardation film having the zero wavelength dispersibility.

DESCRIPTION OF SPECIFIC EMBODIMENTS

A retardation film according to an aspect of the present invention includes a stretched homo polypropylene resin having an isotactic index more than 85 percent. Here, a value obtained by subtracting an average in-plane retardation value of the retardation film from the in-plane retardation value at the retardation film is in a range of ±5 nm. The in-plane retardation value is defined by the following Formula 1:

$$Re=(Nx-Ny)*D \quad \text{[Formula 1]}$$

where Nx is a refractive index in a direction of an axis representing a maximum refractive index, Ny is a refractive index of a direction perpendicular to the axis, and D is a thickness (nm) of the retardation film. Here, the axis representing the maximum refractive index is a delayed phase axis direction in the plane.

The homo polypropylene resin may have a melt flow rate (MFR) in the range of 1 to 15 g/10 min.

The retardation film may be made by stretching an unstretched film. The unstretched film may be made by melting, mixing, and extruding a homo polypropylene resin, and quickly casting the homo polypropylene resin using a cast drum. The cast drum may have a surface temperature in the range of 5 to 35 degrees Celsius.

The retardation film may have a zero wavelength dispersibility. In the zero wavelength dispersibility, a retardation value may increase as a wavelength of transmitted light increases. Also, the zero wavelength dispersibility may have a maximum or minimum wavelength dispersibility ratio in a range of 1±0.1. Here, the wavelength dispersibility ratio is defined by the following Formula 2:

$$\text{Wavelength Dispersibility Ratio}=Re/Re(550) \quad \text{[Formula 2]}$$

where Re is in-plane retardation value in the wavelength of a visible region (400 nm to 800 nm) and Re(550) is an in-plane retardation value with respect to light of wavelength of 550 nm.

According to another aspect of the present invention provided is a laminated optical film including a first retardation film as above and a second retardation film laminated on the first retardation film. The second retardation film has a negative wavelength dispersibility where a retardation value decreases as a wavelength of a transmitted light increases, and the negative wavelength dispersibility has a maximum or minimum wavelength dispersibility ratio beyond a range of 1±0.1. The laminated retardation film has a positive wavelength dispersibility where a retardation value increases as the wavelength of a transmitted light increases, and the positive wavelength dispersibility has a maximum or minimum wavelength dispersibility ratio beyond a range of 1±0.1. The wavelength dispersibility ratio is defined by the above Formula 2.

An angle between a machine direction (MD) of the first retardation film and a retardation axis of the second retardation film may be in a range of 20-40 degrees.

According to the present invention, there is provided a retardation film including a homo polypropylene resin having an isotactic index more than 85 percent and having a zero wavelength dispersibility. Here, a value obtained by subtracting an average in-plane retardation value of the retardation film from the in-plane retardation value at the retardation film is in a range of ±5 nm. That is, in the present invention, the in-plane retardation value is uniform.

According to the present invention, there is provided a broadband optically anisotropic laminated film or polypropylene having a positive wavelength dispersibility for the whole wavelength of visible region, i.e., 400 nm to 800 nm by laminating another retardation film having a negative wavelength dispersibility on the above retardation film having the zero wavelength dispersibility.

DEFINITION

An isotactic index shows an isotacticity. The isotactic index means a weight percentage of isotactic pantads, which is measured by a Nuclear Magnetic Resonance (NMR) Spectrum measurement. A high percentage means a high isotactic index.

A melting flow rate (MFR) means a flux of melted resin per 10 minutes, which is measured by ASTM (American Society for Testing Materials) D 1238.

An in-plane retardation value Re of a film is represented by Formula 1.

The in-plane retardation value Re of the film is dispersed based on the wavelength of the transmitted light. A wavelength dispersibility ratio of the film is a ratio of the in-plane retardation value Re at each wavelength to the in-plane retardation value Re of the center wavelength 550 nm defined by Formula 2.

An optical characteristic of the film may be denoted as one of a positive, negative and zero wavelength dispersibility according to variation of the wavelength dispersibility ratio. In the negative wavelength dispersibility, the retardation value radically decreases as the wavelength of the transmitted light increases in the visible region (400 nm to 800 nm). The negative wavelength dispersibility has a maximum or minimum wavelength dispersibility ratio beyond a range of 1±0.1. In the zero wavelength dispersibility, the retardation value gradually increases or decreases as the wavelength of the transmitted light increases. The zero wavelength dispersibility has a maximum or minimum wavelength dispersibility ratio in a range of 1±0.1. In the positive wavelength dispersibility, the retardation value radically increases as the wavelength of the transmitted light increases. The positive wavelength dispersibility has a maximum or minimum wavelength dispersibility ratio beyond a range of 1±0.1.

Hereinafter, with reference to drawings, an exemplary embodiment of the present disclosure is described in detail.

Most retardation films have a negative wavelength dispersibility due to vibration numbers of the transmitted light and polarizability of the film. When incident light is transmitted to a retardation film having uniform polarizability and dielectric property, the transmitted light has the same frequency as that of the incident light. Here, since a light having high frequency (e.g., a short wavelength/blue light) carries more energy than a light having low frequency (e.g., a long wavelength/red light), the light having high frequency efficiently excites molecules. It generates a polarization in dispersibility, and thus, most retardation films generally have negative wavelength dispersibility in the visible region (400 nm to 800 nm/blue light to red light).

However, polypropylene has zero wavelength dispersibility because polypropylene has a low polarizability due to a low dielectric constant. The conventional retardation film (i.e., polysulfone film) has a strong negative wavelength dispersibility. Since the polysulfone film has a high electron density, by including atomic bonds of S=O and C=O with short bond lengths and lots of benzene ring, the polysulfone film has a high polarizability, and the wavelength is largely dispersed according to the frequency of the transmitted light.

According to the above, in the present embodiment, the polypropylene having low polarizability is used as a base material in order to manufacture a retardation film having a zero wavelength dispersibility.

An optical anisotropy of the polypropylene is caused by low polarizability of high molecule chains and low dielectric constant. However, an average polarizability of every direction in molded and processed polypropylene film has no difference because the molecules are regularly arranged to be crystalline or are irregularly arranged to be amorphous so that the polarizability can be offset. However, by orientation the high molecule chains of polypropylene film through mechanical stretching in a predetermined direction through a mechanical stretching process, the polarizability in the oriented direction increases, and thus, refractive indexes of three main axes (i.e., Nx, Ny, and Nz) are changed according to the orientation state. Thus, the target optical anisotropy of the polypropylene film is implemented by controlling the orientation state, through precisely controlling a stretching ratio, a stretching temperature, a thickness of a film, and an axis angle when a biaxial stretching process is implemented.

Isotactic polypropylene, which is represented by the following Chemical Formula 1, has a high crystallinity because the propylene polymer has a stereo regularity where the methyl groups are arranged at one of the top or bottom with reference to a plane including the main axis. Accordingly, the isotactic propylene can have a high melting point, and thus has a good heat-resistance and a good mechanical property such as a tensile strength.

[Chemical Formula 1]

Also, when the isotactic homo polypropylene film is cast at a temperature below a melting point after extruding the isotactic home polypropylene resin, crystals are grown to a lamellar structure by nucleus creations and spherulites (circular crystals) are formed. And, the lamellar structures are grown in every direction from the center of the spherulites. Then, the growth of lamellar structures are stopped because the lamellar structures contact the adjacent spherulites, or a crystallization process where an internal structure of the spherulites is densified by a continuous crystallization of the amorphous portions remained in the spherulites. If a size of the spherulite from the crystallization process is more than the wavelength of the visible ray or the spherulites is not uniformly distributed, the size of the spherulites is not sufficiently small and the spherulites are not uniformly distributed even after an orientation by stretching. Thus, a film made from the isotactic home propylene resin may have a low transparency or it may be difficult to control the optical anisotropy (i.e., a very high retardation value) of the film.

Because of that, in the conventional method of manufacturing a film made from the propylene resin, the amorphous or low crystallization random and block copolymer, such as the ethylene-propylene copolymer, having no or very low stereo regularity is generally used. However, in this case, a mechanical property such as stiffness or tensile strength of the film is very low because of amorphousness or low crystallinity of the copolymer resin. Also, since the copolymer resin has a low melting point, thermal resistance of the manufactured film is inferior. In addition, because the copolymer resin has a low molecular weight (in comparison with the homo polypropylene resin), the copolymer resin has a high melt flow rate, and thus the machinability regarding stretching and orientation in the copolymer resin is low.

To manufacture a retardation film having enhanced durability and uniformity, the defects (non-uniformity generated by the spherulite in the crystallization process in the case using the homo polypropylene resin, and the low mechanical property such as stiffness or durability in the case using the ethylene-propylene copolymer resin) should be simultaneously overcome. If a size of the spherulite generated in the crystallization process of the homo polypropylene is controlled to a sufficiently small size, the spherulite can be controlled to have a smaller size in the following stretching and orientation processes. To achieve this, it prevents the transparency of the manufactured film from decreasing through uniform distribution of crystals.

Thus, a homo polypropylene resin that is a propylene homopolymer is used as a material of the film to decrease the thickness of the film and increase stiffness and a transparency. Furthermore, the polypropylene having a high isotactic index is used as a material of the film because lots of crystallized nuclei are generated in the polypropylene and the size of the spherulite can be small and uniform in order to ensure a high melting point, machinability in the orientation process by stretching, and stability in the following process (e.g., tensile strength).

Polypropylene resin optimally used by the embodiment includes the homo polypropylene that has a high isotactic index. It is desirable that the isotactic index of the polypropylene resin is at least more than 85 percent, and the stereo regular property is more desirably more than 90 percent. If the isotactic index of the polypropylene resin is less than 85 percent, the haze may increase and the transparency of the film is abruptly lowered and the retardation value is not uniform in the machine and transverse directions.

It is desirable to consider the flow property, such as molecular weight or molecular weight distribution of the polypropylene resin, since the polypropylene resin is a main material for mass and high-speed production. The flow property is considered by measuring a MFR. The MFR may be 1~15 g/10 min. It is desirable that the MFR is 2~10 g/min. If MFR is less than 1 g/10 min, the inner pressure of an extruder during melting or pressing the film of the polypropylene resin becomes large. The machinability in an orientation by stretching process of a high speed may be inferior, the stability in the extruding process may be low, and the retardation value is not uniform. If the MFR is over 15 g/10 min, the film may be broken in the orientation by a stretching process, and thus the film cannot be processed or the retardation value is not uniform.

To further reduce the size of the spherulite of the polypropylene resin, it is desirable that the surface temperature of cast drum be in the range of 5 to 35 degrees Celsius in the process of obtaining an unstretched film by melting, mixing, and extruding the resin, and quickly casting the resin using the cast drum. If the surface temperature of the cast drum is less than 5 degrees Celsius, the unstretched film may have dew condensation, and if the surface temperature of the cast drum is above 35 degrees Celsius, the unstretched film may have low uniformity of a retardation value.

Furthermore, if needed, some nucleation agent may be added in the process of melting and extruding. The nucleation agent may be helpful for crystallization or enhanced heat resistance of the film. Also, in order to enhance machinability or various characteristics of the film without escaping objects implemented by the present invention, additives such as a plasticizer, an anti-oxidant, processing aids, an inorganic filler, a slip agent, a UV absorbent, or an antistatic agent may be added.

Hereinafter, a manufacturing method according to an exemplary embodiment of the present disclosure is described in detail.

The polypropylene resin has a lot of tertiary carbon in its molecular chain, and the hydrogen atom in the polypropylene resin is susceptible to oxidation because the hydrogen atom is prone to be attached by oxygen. To remove gas, e.g., oxygen or moisture in pallet of the polypropylene resin, after drying the polypropylene resin using an inert gas circulation dryer or a vacuum dryer, the polypropylene resin is introduced to an extruding machine with a hopper filled with inert gas such as nitrogen or argon. Herein, the desirable drying temperature is in a range of 20 to 50° C., preferably 30 to 40° C. From 1 to 3 hours are desirable for drying, but more desirable is 1 to 2 hours.

Various methods may be used for forming single-layered or multilayered films with the polypropylene resin by a melting and extruding process. For instance, after transferring the polypropylene resin to an extruding machine for melting at a temperature higher than a melting point, the melted resin is extruded to form a film at a die having a slit type exit and then, an unstretched film is made by a casting process by closely contacting a film to a fine polished cast drum. In the process, a gear pump may be used for measuring or supplying the melted resin extruded from the die, and a filtering system may be used for removing substances like foreign particles, bubbles, carbide, non melting gel etc.

Herein, the extruding machine may include a single axis type or a double axis type, a planetary type or a tandem type. Desirably, so as to minimize heat supplied to the melted resin and prevent deterioration, the resin is entirely melted with a tandem type extruding machine as a first process, and the extruding process is implemented at a relatively low temperature as a second process. Desirably, L/D of the extruding machine is in the range of 28 to 40. Screws such as the vent type, the dulmage type, the full flight type may be used, and the full flight type is desirable. A diameter of the screw may be in the range 30~200Φ according to the amount extruded. If the diameter is smaller than 30Φ, a measuring reliability or a film productivity may be low. If the diameter is more than 200Φ, a processing time of the measured melted resin may be increase and deterioration may be generated.

The gear pump may include an internal lubrication type or an external lubrication type. To efficiently discharge the melted resin, the external lubrication type is more suitable. In the polymer filtering system, one of a leaf disk type, a candle type, a leaf type, or a screen mesh type may be used. To avoid a long residence time for the melted resin, the leaf disk type using plural fine sintered metallic materials may be used. It is desirable that a filtering level is less than 20 um, preferably less than 5 um. If the filtering level is above 20 um, substances like foreign particles, bubbles, carbide, non-melting gel, etc. may penetrate a polymer filter and the manufactured film may exhibit problems such as spots on the film.

A T-die may be used as a die. The T-die includes a coat hanger die and a fish tail die according to manifold type. To uniformly control flow of the resin in the die of a uniform thickness of film and prevent deterioration by the heat, the coat hanger die is more desirable in which residence time of the resin is limited. A die material may include substances such as chrome, nickel, or titanium coated on the surface of steel or stainless layer so as to enhance a surface hardness and decrease a frictional force with the resin.

The fine polished cast roll, such as a chrome or no-electrolyte nickel coated metal roll having heating and cooling means or a ceramic roll may be used as fine polished roll. A nip roll method, a static electric supplying method, an air knife method, a one side belt method, a double-faced belt method, or a three cast drum method may be employed to increase the adhesion between the resin and the fine polished cast roll. To decrease any change of the film, the three cast drum method may be used. The temperature in the casting process is in the 5 to 35 degrees Celsius range, preferably 10 to 20 degrees Celsius such that the size of the spherulite remains small and uniform to thereby prevent the in-plane difference Re from being non-uniform in the crystallization process. If the surface temperature of the cast drum is less than 5 degrees Celsius, the film may have dew condensation caused by a large temperature difference. If the surface temperature of the cast drum is above 35 degrees Celsius, a non-uniformity of a retardation value may be generated.

An unstretched polypropylene film generated by the melting process and extruding process becomes an optically anisotropic film, providing a retardation value to the transmitted light, by stretching the polypropylene film and the orientation of molecule chains in a predetermined direction.

The stretching method is not particularly limited. For example, the stretching method may include a mono axial stretching method or a biaxial stretching method. The mono axially stretching method includes a method using difference of rotation velocity between operational rolls, a method using a pair of rolls that each has different diameters, a method using a tendering method. The biaxial stretching method includes a simultaneous biaxial stretching method and a sequential biaxial stretching method. The simultaneous biaxial stretching method includes a method of stretching in a transverse direction along open angle of a guide rail for clipping as a gap of fixed tender clip is opened and stretched in a machine direction at the same time. The sequential biaxial stretching method includes a method stretching in a transverse direction and clipping each edge of films with the tender clip and passing the tender, after stretching, to a machine direction by using a different rotational velocity between operational rolls. When the stretching method includes a simultaneous biaxial stretching method and a sequential biaxial stretching method, the crossing angle of the two stretching axes is not limited. For example, the crossing angle may be in the range of the 60 to 120 degrees.

If the stretching temperature is between a softening point and a melting point of the resin material, the stretching temperature is not particularly limited. For example, as the stretching temperature becomes lower, the retardation value of the film becomes longer. As the stretching temperature becomes higher, the retardation value of the film becomes smaller. Thus, the stretching temperature is decided based upon characteristics of the film. In order to decrease a non-uniformity in a thickness of the file and a retardation axis, it is preferable that the variation of the stretched temperature is in the range of ±3%, preferably in the range of ±0.5%.

A stretching ratio (film length after stretching/film length before stretching) is decided, based upon polarization according to a molecular orientation, by mechanical stretching of the film. For example, isotactic polypropylene is a non-polarized high molecule. If an electric field is applied to the transmitted light, the isotactic polypropylene has a less polarization in comparison with an intensive polarized resin such as polysulfone or polycarbonate. It needs to increase the stretching ratio such that the film made from the isotactic polypropylene has substantially the same retardation value in comparison with the film made from polysulfone or polycarbonate. Thus, the stretching ratio is preferably in the range of 1.1 to 10 to have the retardation value suitable for a commercial use. In some cases, the stretching ratio is preferably in the range of 2 to 10. As the stretching ratio is increased (when the thickness of the film is the same), the retardation value of the film increases. It is preferable that the variation of the stretched ratio is in the range of ±3%, preferably in the range of ±0.5% to remove non-uniformity of the thickness or the retardation axis. After a final step, the film is preferably heat-set (or annealed) for decreasing the size change of the film, i.e., shrinking or expanding of the film as time changes.

The final thickness of the film, after the stretching process is decided according to the characteristics of the manufactured film. The final thickness may be in the range of 2 to 200 um, preferably in the range of 5 to 50 um. For the same the stretching ratio, a thickened thickness enables a higher control of the retardation value of the film. On the other hand, if the final thickness of films is made to be thin and the stretching ratio high, it is possible to make a thin film or a lightweight film. However, if the thickness is less than 2 um, it is difficult to handle the thin film. The final control for the thickness of the film is carried out by adjusting a thickness of the film before the stretching method, and the thickness distribution of the film is within the range of 3%, preferably in the range of 1%, in reference to the average value to remove non-uniformity in the thickness or the retardation axis.

A special treatment such as a primer coating, a corona treatment, a plasma treatment, a flaming treatment, an ozone showering treatment, or an ion beam treatment may be carried out on the surface of the optically anisotropic film made by the above process to efficiently connect with another element or enhance adhesive strength with another coating layer.

A laminated optical film having a positive wavelength dispersibility according to another aspect of the present invention is a broad band film produced by laminating a first retardation film having a zero wavelength dispersibility and a second retardation film having a negative wavelength dispersibility. The second retardation film is laminated on the first retardation film using adhesives.

The in-plane retardation value Re of the laminated optical film may be calculated by using the following Formula 3:

$$Re(L)=Re(1)-Re(2)-Re(ad)=(\Delta n(1)-\Delta n(2)-\Delta n(ad))*D$$ [Formula 3]

where, Re(L) is an in-plane retardation value (nm) of the laminated film, Re(1) and $\Delta n(1)$ is an in-plane retardation value (nm) and a birefringent of the laminated film having a high retardation value, respectively, Re(2) and $\Delta n(2)$ are an in-plane retardation value (nm) and a birefringent of the laminated film having a low retardation value, respectively, Re(ad) and $\Delta n(ad)$ are respectively an in-plane retardation value (nm) and birefringent of the adhesives, respectively, and D is a thickness (nm) of the film.

Referring to the above Formula 3, the laminated optical film having a positive wavelength dispersibility is formed by laminating a first retardation film having a zero wavelength dispersibility on a second film having a negative wavelength dispersibility defined by Formula 2. In the negative wavelength dispersibility, the retardation value radically decreases as the wavelength of the transmitted light is lengthened in the visible region. The negative wavelength dispersibility has a maximum or minimum wavelength dispersibility ratio beyond a range of 1±0.1. In the positive wavelength dispersibility, the retardation value radically increases as the wavelength of the transmitted light is lengthened. The positive wavelength dispersibility has a maximum or minimum wavelength dispersibility ratio beyond a range of 1±0.1.

The laminated optical film having the positive wavelength dispersibility is formed by laminating the first retardation film having the zero wavelength dispersibility on the second film having the negative wavelength dispersibility. The first retardation film is controlled to have a high retardation value. The laminated optical film has the positive wavelength dispersibility by an interference, i.e., the retardation in the whole visible region, i.e., 400 nm to 800 nm. That is, the broadband laminated optical film can be provided. In addition, this is possible by adjusting the interference through rotating and orientating the retardation film or using the film having a high dispersibility.

Various adhesives for laminating the first retardation film on the second retardation film may be used considering a base material. For example, if polycarbonate is used, acrylic adhesives may be used where no defect, such as white cloudy phenomenon, occurs because the polycarbonate and the acrylic adhesives do not react with each other. Adhesives having an adhesive force more than 500 gf/25 mm may be used. A coating thickness of the adhesives is in the range of 0.5 to 30 um, preferably 1 to 10 um. If the coating thickness of the adhesives is less than 0.5 um, the workability or adhesion force of the film may decrease because of the non-uniform adhesive force. If the coating thickness of the adhesives is above 30 um, the broadband optically anisotropic laminated film has an inferior retardation property.

Various kinds of methods may be used for coating the adhesives. The method is not limited. For instance, various coaters, such as an air duct coater, a blade coater, a load coater, a knife coater, a comma coater, a slot die coater, a squeezing coater, a curtain coater, or a bar coater, may be used for coating. After coating the adhesives, the broadband anisotropic polypropylene laminated film is obtained by passing a drying chamber and carrying out a dry laminating method and pressing with a rubber pressing roll.

A protecting film may be laminated on the laminated optical film according to the present invention to protect itself from outdoor temperature, humidity, and physical shock. Also, a protective layer may be formed on at least one surface of the laminated optical film according to the present invention by attaching on some elements such as glass, mirror, plastic things or a plastic film. Also, the adhesive coating layer may be formed.

EXEMPLARY EMBODIMENTS

More details of exemplary embodiments of the present disclosure are included in the following description and drawings. It should be noted that the present invention is not limited to following description and drawings. Also, experimental conditions of the following exemplary embodiments are described hereinafter.

Experimental Condition: Effects (1) Isotactic Index

An isotactic index was measured by a weight percentage of isotactic pantads, which is measured by a Nuclear Magnetic Resonance (NMR) Spectrum measurement.

(2) Melt Flow Rate

A melting flow rate (MFR) was measured by a flux (g) of the melted resin per 10 minutes, which is measured by ASTM (American Society for Testing Materials) D 1238.

(3) Ethylene Content

Through FT-IR spectrum analysis for an ethylene-propylene copolymer, the amount of ethylene content of the copolymer was measured.

(4) Transmissivity and Haze of an Incident Light

By using a haze meter of integrating sphere type, a light transmissivity and a haze was measured.

(5) Stretching Machinability

A test for 24 hours under every experimental condition was carried out. If there was no broken film for 24 hours, it is denoted '0', if the broken times of films are less than 5, it is denoted 'Δ', and if the broken times exceeds 5 times or more, it is denoted 'x'.

(6) Optical Anisotropy

The optical anisotropy was measured using an inspection device of RETS manufactured by Otsuka electric company.

In-Plane Retardation Value Re)

In a sample film having width and length of 1 m and 1 m, the Re in the entire visible region (400 nm to 800 nm) was measure at three points of 20 mm crosswise intervals and 20 mm lengthwise. Averages of the measured Re were schematized and evaluated for each sample and each spectrum.

In-Plane Retardation Value Re Uniformity)

In a sample film having width and length 1 m and 1 m, the retardation value at the wavelength of 550 nm was measure at three points of 20 mm crosswise intervals and 20 mm lengthwise. If the measured Re at the wavelength of 550 nm was in the range of 5 nm about the average, it is denoted 'O'. If the measured Re at the wavelength of 550 nm was between 5 nm and 10 nm about the average, it is denoted 'Δ'. If the measured value Re at the wavelength of 550 nm was over 10 nm about the average, it is denoted 'x'.

(Wavelength Dispersibility)

A percentage of the in-plane retardation value Re in the visible region and the in-plane retardation value Re(550) at the wavelength of 550 nm was calculated as Re/Re (550). By measuring the variation of Re/Re (550) in the visible region (400 nm to 800 nm), it was evaluated whether the variation is positive, negative, or zero wavelength dispersibility.

In the negative wavelength dispersibility, the retardation value radically decreases as the wavelength of the transmitted light increases in the visible region (400 nm to 800 nm). The negative wavelength dispersibility has a maximum or minimum wavelength dispersibility ratio beyond a range of 1±0.1. In the zero wavelength dispersibility, the retardation value gradually increases or decreases as the wavelength of the transmitted light increases. The zero wavelength dispersibility has a maximum or minimum wavelength dispersibility ratio in a range of 1±0.1. In the positive wavelength dispersibility, the retardation value radically increases as the wavelength of the transmitted light increases.

In-plane Retardation Axis)

By using a polarizing microscope, an angle of an optical axis was measured at intervals of 20 mm in the width of 600 mm of the sample film.

(7) Adhesive Strength

By using a universal test machine, when one laminated portion of the sample film having a width of 25 mm is being detached with 300 mm/min for 180 degrees Celsius, the load was measured.

Exemplary Embodiment 1 to 10

Manufacturing a Retardation Film

The following exemplary embodiments 1 to 10 are for evaluating whether in-plane retardation value Re is a zero wavelength dispersibility when the homo polypropylene resin having a low dielectric property according the present invention is used, and whether a control of the in-plane retardation value is possible by controlling conditions of a stretching method and a final thickness of the film.

Exemplary Embodiment 1

A homo polypropylene (a melting point: 168 degrees Celsius) of 100 weight % having an isotactic index of 98% and an MFR (melt flow rate) of 3.0 g/10 min was melted and mixed in each extruder of a three layered co-extrusion type at the resin temperature of 250 degrees Celsius. Diameters of screws of the extruder were 65 mmΦ, 125 mmΦ and 65 mmΦ. (The extruder of 125 mmΦ is a tandem type). The homo polypropylene resin was co-extruded using feedblock type T-die to have three layers, i.e., skin A layer/core layer/skin B layer. An unstretched cast film was obtained through quickly casting by using three fine polished cast rolls of 20 degrees Celsius. Then, the unstretched cast film was introduced into a machine direction (MD) stretching machine. After preheating the introduced unstretched cast film, the introduced unstretched cast film was stretched in the machine direction in the state that a stretching temperature, that is, the temperature of stretching rolls was maintained at 120 degrees Celsius. The stretched film had double the length, compared with unstretched film, in the machine direction through three stretching stages by a speed difference of the rolls. Then, the film stretched in the machine direction was introduced to a tender type stretching machine and was preheated. The introduced film is stretched in the tender type stretching machine. Here, the stretching zone of the tender type stretching machine was maintained at 155 degrees Celsius, and the introduced film was stretched in a transverse direction so that the relaxation ratio of the rail width of the tender in the transverse direction is 4% and the stretching ratio in the transverse direction was four times. Then, the heat setting or annealing was carried out at 165 degrees Celsius. And then, a corona discharge treatment was carried out so that a surface tension of one side of the film is kept above 38 dyne/cm. Finally, by winding the film, the optically anisotropic polypropylene film P1 having 8 um as a final thickness and having a three-layered structure was manufactured.

Exemplary Embodiment 2

The optically anisotropic polypropylene film P2 was manufactured under the same conditions of exemplary embodiment 1 except for a stretching ratio being 3.03 times for the machine direction and 5.91 times for the transverse direction.

Exemplary Embodiment 3

The optically anisotropic polypropylene film P3 was manufactured under the same conditions of exemplary embodiment 1 except for the stretching ratio being 4.71 times for the machine direction and 9.05 times for the transverse direction.

Exemplary Embodiment 4

The optically anisotropic polypropylene film P4 was manufactured under the same condition of exemplary embodiment 2 except for the optically anisotropic polypropylene film P4 having 25 um as a final thickness.

Exemplary Embodiment 5

The optically anisotropic polypropylene film P5 was manufactured under the same condition of exemplary embodiment 2 except for the optically anisotropic polypropylene film P5 having 40 um as a final thickness.

Exemplary Embodiment 6

A homo polypropylene (a melting point: 168 degrees Celsius) of 100 weight % having an isotactic index is 98% and an MFR (melt flow rate) of 3.0 g/10 min was melted and mixed in each extruder at the resin temperature of 250 degrees Celsius. A diameter of a screw of the extruder was 65 mmΦ. The homo polypropylene resin was extruded as a film by using a coat hanger type T-die. An unstretched cast film was obtained through quickly casting by using three fine polished cast rolls of 20 degrees Celsius. Then, the unstretched cast film was introduced into a stretching machine. After preheating the introduced unstretched cast film, the introduced unstretched cast film was stretched in the machine direction to have a 1.1 times length in the machine direction through three stretching stages by a speed difference of the rolls at a stretching temperature, that is, the temperature of stretching rolls maintained at 120 degrees Celsius. Then, the heat setting or annealing was carried out at 165 degrees Celsius. And then, a corona discharge treatment was carried out so that a surface tension of one side of the film is kept more than 38 dyne/cm. Finally, by winding the film, the optically anisotropic polypropylene film P1 having 40 um as a final thickness and having a single-layered structure was manufactured.

Exemplary Embodiment 7

The optically anisotropic polypropylene film P7 was manufactured under the same conditions of exemplary embodiment 6 except for the stretching ratio being 2.5 times for the machine direction.

Exemplary Embodiment 8

The optically anisotropic polypropylene film P8 was manufactured under the same conditions of exemplary embodiment 6 except for the stretching ratio being 4.71 times for the machine direction.

Exemplary Embodiment 9

The optically anisotropic polypropylene film P9 was manufactured under the same conditions of exemplary embodiment 6 except for the stretching temperature being 110 degrees Celsius.

Exemplary Embodiment 10

The optically anisotropic polypropylene film P10 was manufactured under the same conditions of exemplary embodiment 6 except for the stretching temperature being 135 degrees Celsius.

Comparison Examples 1 to 3

Manufacturing Method of an Unstretched Polypropylene Film and a Polysulfone Optically Anisotropic Film, and Evaluation of a Polycarbonate Optically Anisotropic Film Comparison Example 1

The unstretched polypropylene film RP1 was manufactured under the same conditions of exemplary embodiment 6 except that the speed of the rolls was substantially the same and the extruding process was controlled to allow the thickness of final films to be 40 um.

Comparison Example 2

In a melting extruder (screw diameter is 30 mmΦ), the temperatures of the cylinders are respectively at 315 degrees Celsius, 345 degrees Celsius, and 345 degrees Celsius, according to the order of distance from a material hopper. A polysulfone($C_{27}H_{22}O_4S$) of 100 weight % as a resin material was mixed and melted at 310 degrees Celsius. The mixed and melted polysulfone was extruded to film shapes using T-die with the width of 40 mm, and was quickly casted in three fine polished cast rolls, each being at 25 degrees Celsius. A corona discharge treatment was carried out so that a surface tension of one side of the film was kept more than 45 dyne/cm. Thus, by winding the film, the unstretched cast film was obtained. The optical anisotropy film RP2 was made from the winded unstretched cast film by using another stretching machine for the machine direction. Here, the stretching temperature is 275 degrees Celsius and the introduced unstretched cast film was stretched 1.13 times in the machine direction through three stretching stages by a speed differences of the rolls. The final thickness of the optical anisotropy film RP2 was 72 um, and the optical anisotropy film has a single-layered structure.

Comparison Example 3

The conventional retardation film PR3 having a negative wavelength dispersibility and being made from a group of polycarbonate with a thickness of 50 um was evaluated.

Process conditions and evaluation results of the exemplary embodiments 1 to 10 and the comparison example 1 to 3 are listed in the following Table 1 and FIGS. 1 and 2.

TABLE 1

Process conditions and evaluation results of the exemplary embodiments 1 to 10 and the comparison examples 1 to 3

| section | | | examplary 1 | examplary 2 | examplary 3 | examplary 4 | examplary 5 | examplary 6 | examplary 7 |
|---|---|---|---|---|---|---|---|---|---|
| denoting symbol | | | P1 | P2 | P3 | P4 | P5 | P6 | P7 |
| isotactic index (%) | | | 98% | 98% | 98% | 98% | 98% | 98% | 98% |
| MFR (g/10 min) | | | 3.0 | 3.0 | 3.0 | 3.0 | 3.0 | 3.0 | 3.0 |
| Cooled temperature (° C.) | | R1 | 20 | 20 | 20 | 20 | 20 | 20 | 20 |
| | | R2 | 20 | 20 | 20 | 20 | 20 | 20 | 20 |
| | | R3 | 20 | 20 | 20 | 20 | 20 | 20 | 20 |
| stretching condition | stretching ratio | row stretching | 2 | 3.03 | 4.71 | 3.03 | 3.03 | 1.1 | 2.5 |
| | | column stretching | 4 | 5.91 | 9.05 | 5.91 | 5.91 | — | — |
| | stretching temperature (° C.) | row stretching | 120 | 120 | 120 | 120 | 120 | 120 | 120 |
| | | column stretching | 155 | 155 | 155 | 155 | 155 | — | — |
| finally formed film thickness (μm) | | | 8 | 8 | 8 | 25 | 40 | 40 | 40 |

TABLE 1-continued

Process conditions and evaluation results of the exemplary embodiments 1 to 10 and the comparison examples 1 to 3

| results | * stretching ability (x~o, times) | ○ 0 | ○ 0 | ○ 0 | ○ 0 | ○ 0 | ○ 0 | ○ 0 |
|---|---|---|---|---|---|---|---|---|
| | * light transmittance (%) | 89.9 | 91.4 | 92.2 | 91.0 | 90.6 | 88.3 | 89.7 |
| | * haze (%) | 0.8 | 0.7 | 0.7 | 0.8 | 0.9 | 1.4 | 1.0 |
| | * in-plain retardation value Re (550) | 104.8 | 137.6 | 273.4 | 210.0 | 284.7 | 82.5 | 131.3 |
| | * Re (550) uniformity (x~o, ±nm) | ○ 4 | ○ 3 | ○ 3 | ○ 2 | ○ 3 | ○ 3 | ○ 3 |
| | Wavelength dispersibiliy | {0} | {0} | {0} | {0} | {0} | {0} | {0} |
| | -. Re (400)/Re (550) | 1.020 | 1.019 | 1.023 | 1.021 | 1.022 | 1.021 | 1.023 |
| | -. Re (500)/Re (550) | 1.004 | 1.004 | 1.005 | 1.007 | 1.006 | 1.007 | 1.005 |
| | -. Re (550)/Re (550) | 1 | 1 | 1 | 1 | 1 | 1 | 1 |
| | -. Re (600)/Re (550) | 0.997 | 0.997 | 0.996 | 0.997 | 0.997 | 0.996 | 0.997 |
| | -. Re (700)/Re (550) | 0.992 | 0.992 | 0.990 | 0.990 | 0.991 | 0.990 | 0.992 |
| | -. Re (800)/Re (550) | 0.988 | 0.989 | 0.989 | 0.988 | 0.989 | 0.988 | 0.986 |

| section | | | examplary 8 | examplary 9 | examplary 10 | comparison example 1 | comparison example 2 | comparison example 3 |
|---|---|---|---|---|---|---|---|---|
| denoting symbol | | | P8 | P9 | P10 | RP1 | RP2 | RP3 |
| isotactic index (%) | | | 98% | 98% | 98% | 98% | — | — |
| MFR (g/10 min) | | | 3.0 | 3.0 | 3.0 | 3.0 | — | — |
| Cooled temperature (° C.) | | R1 | 20 | 20 | 20 | 20 | 25 | — |
| | | R2 | 20 | 20 | 20 | 20 | 25 | — |
| | | R3 | 20 | 20 | 20 | 20 | 25 | — |
| stretching condition | stretching ratio | row stretching | 4.71 | 2.5 | 2.5 | — | 1.13 | — |
| | | column stretching | — | — | — | — | — | — |
| | stretching temperature (° C.) | row stretching | 120 | 110 | 135 | — | — | — |
| | | column stretching | — | — | — | — | — | — |
| finally formed film thickness (μm) | | | 40 | 40 | 40 | 40 | 72 | 50 |
| results | * stretching ability (x~o, times) | | ○ 0 | ○ 0 | ○ 0 | — | — | — |
| | * light transmittance (%) | | 90.8 | 89.6 | 89.7 | 87.0 | 92.7 | 92.9 |
| | * haze (%) | | 0.8 | 0.9 | 0.8 | 2.0 | 0.5 | 0.4 |
| | * in-plain retardation value Re (550) | | 206.5 | 147.3 | 105.2 | 78.6 | 137.0 | 136.7 |
| | * Re (550) uniformity (x~o, ±nm) | | ○ 3 | ○ 3 | ○ 2 | ○ 2 | ○ 4 | ○ 4 |
| | Wavelength dispersibiliy | | {0} | {0} | {0} | {0} {—} | {—} |
| | -. Re (400)/Re (550) | | 1.020 | 1.020 | 1.021 | 1.020 | 1.255 | 1.143 |
| | -. Re (500)/Re (550) | | 1.007 | 1.004 | 1.006 | 1.004 | 1.074 | 1.040 |
| | -. Re (550)/Re (550) | | 1 | 1 | 1 | 1 | 1 | 1 |
| | -. Re (600)/Re (550) | | 0.996 | 0.996 | 0.995 | 0.997 | 0.944 | 0.969 |
| | -. Re (700)/Re (550) | | 0.993 | 0.990 | 0.991 | 0.993 | 0.865 | 0.927 |
| | -. Re (800)/Re (550) | | 0.989 | 0.984 | 0.988 | 0.991 | 0.840 | 0.905 |

Figure 1:
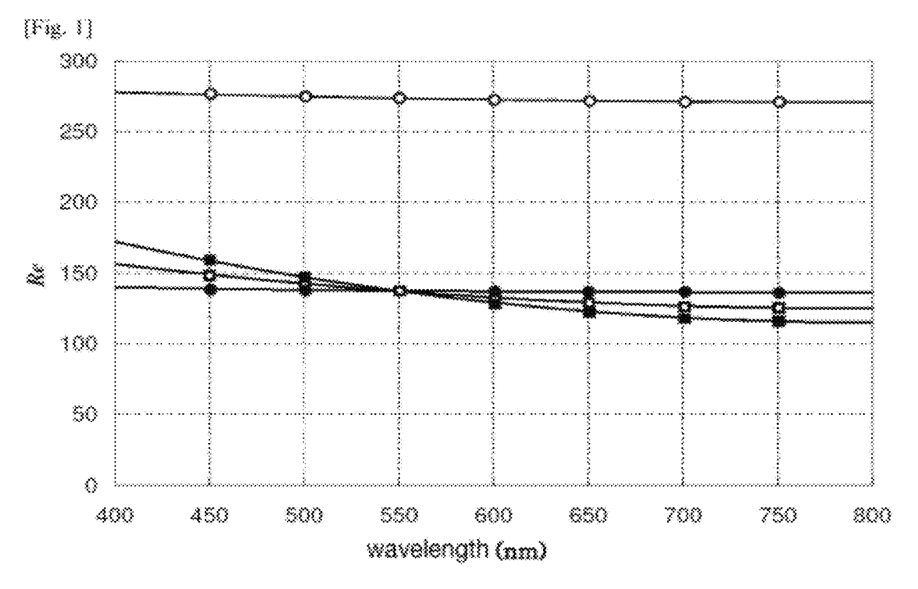
FIG. 1 is a graph showing a retardation value Re of an optically anisotropic film in a visible region according to second and third embodiments and second and third comparison examples of the present invention. Here, a line having a mark of ● corresponds to the second embodiment, a line having a mark of ○ corresponds to the third embodiment, a line having a mark of ■ corresponds to the second comparison embodiment, and a line having a mark of □ corresponds to the third comparison embodiment.

FIG. 1 is a graph showing a retardation value Re of an optical anisotropic film in a visible region according to second and third embodiments and second and third comparison examples of the present invention. (Here, a line having a mark of ● corresponds to the exemplary embodiment 2, a line having a mark of ○ corresponds to the exemplary embodiment 3, a line having a mark of ■ corresponds to the comparison embodiment 2, and a line having a mark of □ corresponds to the comparison embodiment 3.)

Figure 2:
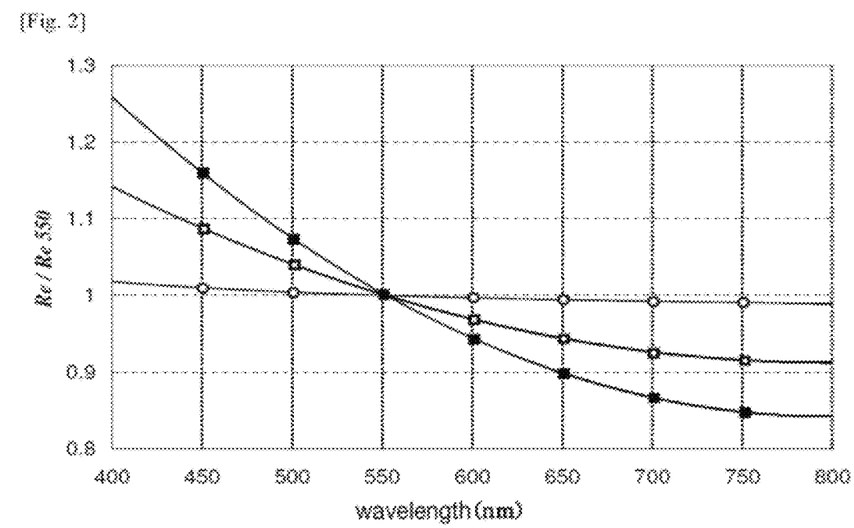
FIG. 2 is a graph showing a wavelength dispersibility Re/Re(550) of an optically anisotropic film in the visible region according to third embodiment, and second and third comparison examples of the present invention. Here, a line having a mark of ○ corresponds to the third embodiment, a line having a mark of ■ corresponds to the second comparison embodiment, and a line having a mark of □ corresponds to the third comparison embodiment.

FIG. 2 is a graph showing a wavelength dispersibility Re/Re(550) of an optically anisotropic film in the visible region according to third embodiment, and second and third comparison examples of the present invention. (Here, a line having a mark of ○ corresponds to the exemplary embodiment 3, a line having a mark of ■ corresponds to the comparison embodiment 2, and a line having a mark of □ corresponds to the comparison embodiment 3.)

As shown in Table 1, FIGS. 1 and 2, the in-plane retardation value Re of the optically anisotropic film according to the present invention has a zero wavelength dispersibility by using the homo polypropylene resin having a low dielectric constant as a material of the film. The optically anisotropic film according to the present invention represented a target retardation value at a specific wavelength, e.g., 550 nm by the controlling the stretching condition and final thickness of the films.

Exemplary Embodiment 11 to 18

Manufacturing a Retardation Film Having Uniform In-Plane Retardation Value

Exemplary Embodiment 11

The optically anisotropic polypropylene film P11 was manufactured under the same conditions of exemplary embodiment 2 except for using a homo polypropylene resin having an isotactic index of 92% as a material of the film resin.

Exemplary Embodiment 12

The optically anisotropic polypropylene film P12 was manufactured under the same conditions of exemplary embodiment 2 except for using a homo polypropylene resin having an isotactic index of 85% as a material of the film.

Exemplary Embodiment 13

The optically anisotropic polypropylene film P13 was manufactured under the same conditions of exemplary embodiment 2 except for the temperature of the three cast drums being 10 degrees Celsius.

Exemplary Embodiment 14

The optically anisotropic polypropylene film P14 was manufactured under the same conditions of exemplary embodiment 2 except for the temperature of the three cast drums being 5 degrees Celsius.

Exemplary Embodiment 15

The optically anisotropic polypropylene film P15 was manufactured under the same conditions of exemplary embodiment 2 except for the temperature of the three cast drums being 30 degrees Celsius.

Exemplary Embodiment 16

The optically anisotropic polypropylene film P16 was manufactured under the same conditions of exemplary embodiment 2 except for the melt flow index being 1.0 g/10 min.

Exemplary Embodiment 17

The optically anisotropic polypropylene film P17 was manufactured under the same conditions of exemplary embodiment 2 except for the melt flow index being 8.0 g/10 min.

Exemplary Embodiment 18

The optically anisotropic polypropylene film P18 was manufactured under the same conditions of exemplary embodiment 2 except for the melt flow index being 15.0 g/10 min.

Comparison Examples 4 to 8

Manufacturing a Retardation Film Having a Non-Uniform In-Plane Retardation Value and an Optically Anisotropic Film with Ethylene-Propylene Copolymer Comparison Example 4

The optically anisotropic polypropylene film RP4 was manufactured under the same conditions of exemplary embodiment 2 except for using a homo polypropylene resin having an isotactic index of 81% as a material of a film resin.

Comparison Example 5

The optically anisotropic polypropylene film RP5 was manufactured under the same conditions of exemplary embodiment 2 except for the temperature of the three cast drums being 35 degrees Celsius.

Comparison Example 6

The optically anisotropic polypropylene film RP6 was manufactured under the same conditions of exemplary embodiment 2 except for the melt flow index being 0.5 g/10 min.

Comparison Example 7

The optically anisotropic polypropylene film RP7 was manufactured under the same conditions of exemplary embodiment 2 except for using an amorphous ethylene-propylene random copolymer (a melting point: 135 degrees Celsius) in which the percentage of ethylene was 4.9% and the melt flow index was 8 g/10 min wherein the amorphous ethylene-propylene random copolymer was stretched in the machine direction at 155 degrees Celsius and then in the transverse direction at 122 degrees Celsius such that the final thickness of the film was 30 um.

Comparison Example 8

The optically anisotropic polypropylene film RP8 was manufactured under the same conditions of comparison example 2 except for using an amorphous ethylene-propylene random copolymer in which the percentage of ethylene was 1.8% and the melt flow index was 5.0 g/10 min Process conditions and evaluation results of the exemplary embodiments 11 to 18 and the comparison examples 4 to 8 are listed in the following Table 2.

TABLE 2

Process conditions and evaluation results of the exemplary embodiments 11 to 18 and the comparision examples 4 to 8

| section | | | examplary 11 | examplary 12 | comparison example 4 | examplary 13 | examplary 14 | examplary 15 | comparison example 5 |
|---|---|---|---|---|---|---|---|---|---|
| denoting symbol | | | P11 | P12 | RP4 | P13 | P14 | P15 | RP5 |
| isotactic index (%) or (ethylene content (%)) | | | 92% | 85% | 81% | 98% | 98% | 98% | 98% |
| MFR (g/10 min) | | | 3.0 | 3.0 | 3.0 | 3.0 | 3.0 | 3.0 | 3.0 |
| cast drum temperature (° C.) | | R1 | 20 | 20 | 20 | 10 | 5 | 35 | 40 |
| | | R2 | 20 | 20 | 20 | 10 | 5 | 35 | 40 |
| | | R3 | 20 | 20 | 20 | 10 | 5 | 35 | 40 |
| stretching condition | stretching ratio | row stretching | 3.03 | 3.03 | 3.03 | 3.03 | 3.03 | 3.03 | 3.03 |
| | | column stretching | 5.91 | 5.91 | 5.91 | 5.91 | 5.91 | 5.91 | 5.91 |
| | stretching temperature (° C.) | row stretching | 120 | 120 | 120 | 120 | 120 | 120 | 120 |
| | | column stretching | 155 | 155 | 155 | 155 | 155 | 155 | 155 |
| finally formed film thickness (μm) | | | 8 | 8 | 8 | 8 | 8 | 8 | 8 |
| results | * stretching ability (x~o, times) | | ○ 0 | □ 2 | □ 3 | ○ 0 | ○ 0 | ○ 0 | ○ 0 |
| | * light transmittance (%) | | 89.4 | 88.9 | 86.7 | 91.5 | 91.2 | 90.4 | 89.7 |
| | * haze (%) | | 1.2 | 1.3 | 1.9 | 0.6 | 0.6 | 0.8 | 1.0 |
| | * in-plane retardation value Re (550) | | 136.8 | 137.1 | 137.7 | 136.9 | 136.5 | 137.8 | 137.4 |
| | * Re (550) uniformity (x~o, ±nm) | | ○ 4 | Δ 7 | x 11 | ○ 3 | ○ 3 | Δ 9 | x 13 |
| | * reference | | — | — | — | — | Dew condensation | — | — |

| section | | | examplary 16 | comparison example 6 | examplary 17 | examplary 18 | comparison example 7 | comparison example 8 |
|---|---|---|---|---|---|---|---|---|
| denoting symbol | | | P16 | RP6 | P17 | P18 | RP7 | RP8 |
| isotactic index (%) or (ethylene content (%)) | | | 98% | 98% | 98% | 98% | (4.9%) | (1.8%) |
| MFR (g/10 min) | | | 1.0 | 0.5 | 8.0 | 15 | 8.0 | 5.0 |
| cast drum temperature (° C.) | | R1 | 20 | 20 | 20 | 20 | 20 | 20 |
| | | R2 | 20 | 20 | 20 | 20 | 20 | 20 |
| | | R3 | 20 | 20 | 20 | 20 | 20 | 20 |
| stretching condition | stretching ratio | row stretching | 3.03 | 3.03 | 3.03 | 3.03 | 3.03 | 3.03 |
| | | column stretching | 5.91 | 5.91 | 5.91 | 5.91 | 5.91 | 5.91 |
| | stretching temperature (° C.) | row stretching | 120 | 120 | 120 | 120 | 115 | 115 |
| | | column stretching | 155 | 155 | 155 | 155 | 122 | 122 |
| finally formed film thickness (μm) | | | 8 | 8 | 8 | 8 | 30 | 30 |
| results | * stretching ability (x~o, times) | | Δ 4 | x 7 | ○ 0 | Δ 4 | x 11 | Δ 5 |
| | * light transmittance (%) | | 91.2 | 91.2 | 91.6 | 90.9 | 91.5 | 91.3 |
| | * haze (%) | | 0.7 | 0.7 | 0.7 | 0.7 | 0.6 | 0.5 |
| | * in-plane retardation value Re (550) | | 137.2 | 136.6 | 137.5 | 136.9 | 152.7 | 150.4 |
| | * Re (550) uniformity (x~o, ±nm) | | ○ 3 | x 11 | ○ 4 | ○ 3 | x 17 | □ 10 |
| | * reference | | — | — | — | — | — | — |

As shown in Table 2, the optically anisotropic polypropylene films according to the present invention may have various optical characteristics and manufacturing stabilities, such as a uniform in-plane retardation value Re due to the physical and chemical characteristics of resin in spite of the same conditions being applied to the stretching process. Crystal growth mechanism in the crystallization process of isotactic polypropylene resins affects the various optical characteristics and processing stability. Thus, it is needed to control sizes and distribution of the spherulite in the crystallization process through optimal materials and manufacturing conditions. It is also needed to decide the resin materials having the optimal melting flow index considering manufacturing stability. The optical anisotropy polypropylene films manufactured by exemplary embodiments 11 to 18 have a great manufacturing stability and uniform in-plane retardation value Re in comparison with comparison examples 7 and 8.

As shown in the exemplary embodiments 11 and 12 and comparison 4, if the isotactic index according to the present invention is over 85%, the optically anisotropic polypropylene films have uniform in-plane retardation values. Specially, if the isotactic index according to the present invention is over 90%, the optically anisotropic polypropylene films have an enhanced uniform in-plane retardation value.

As shown in the exemplary embodiments 16 to 18 and comparison 6, if the melting flow index according to the present invention is over 1.0, the optically anisotropic polypropylene films have uniform in-plane retardation values. If the melting flow index is below 1.0, the optically anisotropic polypropylene films have non-uniform in-plane retardation values.

As shown in the exemplary embodiments 13 to 15 and comparison 5, if the temperature of cast drums is under 35 degrees Celsius according to the present invention, the optically anisotropic polypropylene films have an enhanced uniform in-plane retardation values.

Exemplary Embodiment 19 to 21

Manufacturing a Broadband Optically Anisotropic laminated film

Exemplary Embodiment 19

At a roll-to-roll film coater including a slot die coating heading unit and a laminating unit, an acrylic adhesive was coated with 5 um on one side of the broadband optically anisotropic film P3 (polypropylene: PP) and the optically anisotropic film P3 was dried to remove the solvent included in the acrylic adhesive. The optically anisotropic laminated film P19 was formed to have a form of a roll by laminating the optically anisotropic film P3 on the optically anisotropic films RP3 (polycarbonate: PC).

Exemplary Embodiment 20

The optically anisotropic polypropylene film P20 was manufactured under the same conditions of exemplary embodiment 19 except for using the optically anisotropic film RP2 (poly polysulfone: PSU) instead of the optically anisotropic film RP3.

Exemplary Embodiment 21

The optically anisotropic polypropylene film P3 was manufactured under the same conditions of exemplary embodiment 19 except for using a polyester release film of 25 um instead of the optically anisotropic films RP3. Here, the angle between a retardation axis of the optically anisotropic film RP2 and an edge of the transverse direction of the sheet was 60 degrees. The sheet was cut for a size of 500 mm*400 mm.

This embodiment of the present invention is for manufacturing a laminated film where an angle between a machine direction of a first retardation film P3 and a retardation axis of the retardation film RP2 is 30 degrees. That is, the broadband optically anisotropic laminated film P21 was manufactured by roll-to-sheet laminating where a length direction of the sheet and a direction progressed by the rolls are the same directions.

Comparison Example 9

Manufacturing an Optically Anisotropic Laminated Film

Comparison Example 9

The optically anisotropic polypropylene film PR9 was manufactured under the same conditions of exemplary embodiment 19 except for using the optically anisotropic films P2 instead of the optically anisotropic films P3 and RP3.

Process conditions and evaluation results of the exemplary embodiment 19 to 21 and the comparison example 9 are listed in the following Table 3.

TABLE 3

Process conditions and evaluation results of the exemplary embodiments 19 to 21 and the comparison example 9

| | section | examplary 19 | examplary 20 | examplary 21 | comparison example 9 |
|---|---|---|---|---|---|
| | * denoting symbol | P19 | P20 | P21 | RP9 |
| results | * thickness of laminated films(μm) | 64 | 83 | 84 | 21 |
| | * adhesive strength(gf/25 mm) | 1,260 | 1,310 | 1,210 | 970 |
| | * light transmittance (%) | 88.5 | 88.1 | 87.9 | 86.7 |
| | * haze(%) | 0.9 | 1.1 | 1.0 | 1.0 |
| | * in-plain__retardation value Re(550) | 137.4 | 137.2 | 137.5 | 276.2 |
| | * Re(550) uniformity (x~o, ±nm) | ○ | ○ | ○ | ○ |
| | | 4 | 4 | 3 | 4 |

TABLE 3-continued

Process conditions and evaluation results of the exemplary
embodiments 19 to 21 and the comparison example 9

| section | examplary 19 | examplary 20 | examplary 21 | comparison example 9 |
|---|---|---|---|---|
| * wavelength dispersibility | {+} | {+} | {+} | {0} |
| -. Re(400)/Re(550) | 0.892 | 0.780 | 0.671 | 1.022 |
| -. Re(500)/Re(550) | 0.968 | 0.934 | 0.909 | 1.005 |
| -. Re(550)/Re(550) | 1 | 1 | 1 | 1 |
| -. Re(600)/Re(550) | 1.025 | 1.050 | 1.083 | 0.996 |
| -. Re(700)/Re(550) | 1.058 | 1.122 | 1.208 | 0.990 |
| -. Re(800)/Re(550) | 1.074 | 1.139 | 1.273 | 0.987 |

Figure 3:
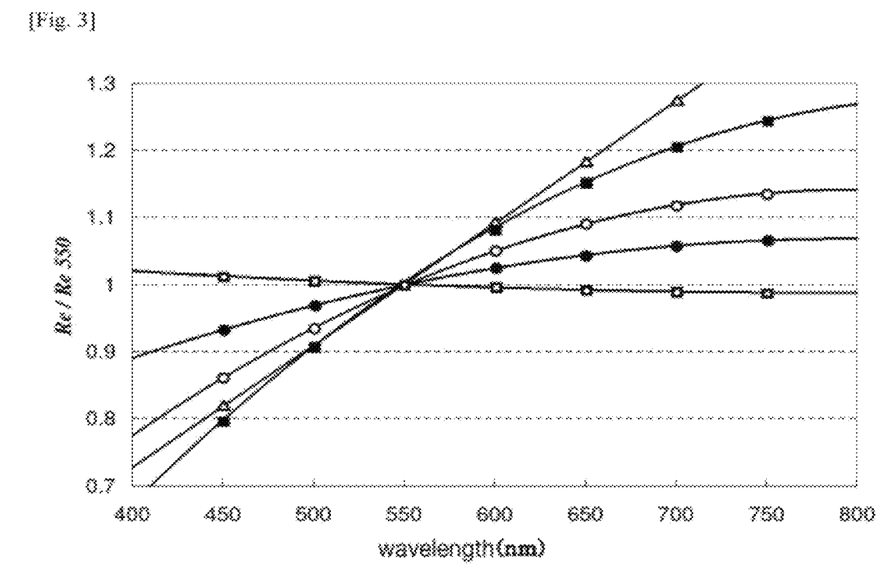
FIG. 3 is a graph showing a wavelength dispersibility Re/Re(550) of a broadband optically anisotropic laminated film in the visible region according to the nineteenth to twenty first embodiments and the ninth comparison example of the present invention in comparison with ideal broadband values. Here, a line having a mark of Δ corresponds to the ideal broadband values, a line having a mark of ● corresponds to the nineteenth embodiment, a line having a mark of ○ corresponds to the twentieth embodiment, a line having a mark of ■ corresponds to the twenty first embodiment, and a line having a mark of □ corresponds to the ninth comparison embodiment.

FIG. 3 is a graph showing a wavelength dispersibility Re/Re(550) of a broadband optically anisotropic laminated film in the visible region according to nineteenth to twenty first embodiments and ninth comparison example of the present invention in comparison with theoretical broadband values. Here, a line having a mark of Δ corresponds to the ideal broadband values, a line having a mark of ● corresponds to the exemplary embodiment 19, a line having a mark of ○ corresponds to the exemplary embodiment 20, a line having a mark of ■ corresponds to the exemplary embodiment 21, and a line having a mark of □ corresponds to the comparison embodiment 9.

As shown in Table 3 and FIG. 3, the laminated optical film according to the present invention having a positive wavelength dispersibility is formed by laminating a first retardation film having a zero wavelength dispersibility on a second film having a negative wavelength dispersibility where the first retardation film is controlled to have a high absolute value of the retardation value. The laminated optical film has positive wavelength dispersibility by offset or variation of retardation value for the whole visible region, i.e., 400 nm to 800 nm. That is, it can be seen that the laminated optical film has a broadband function. Also, the films formed by rotating the retardation axis of a structure film having the negative wavelength dispersibility to laminate on a film having a zero wavelength dispersibility has theoretical values for the whole visible region, i.e., 400 nm to 800 nm.

As described above, the present invention provides an optical film having a broadband retardation value needed for reflective or transflective liquid crystal display devices or optical pick-up and disc apparatuses. Also, an optically anisotropic film and an optically anisotropic laminated film according to the present invention may be adapted to mobile devices, such as a cellar phone, a PMP, a PDA, a car navigation set, an information terminal unit, or a wireless beeper, various LCD devices such as a monitor, a flat TV illuminating panel, office automation devices, an AV apparatus, and field effect emitting devices such as a 3D cubic display device, a LCD projector, a touch panel, an OLED device, and an EL device. Also, an optically anisotropic film and an optically anisotropic laminated film according to the present invention may be adapted to playing devices or memory devices such as a CD, a DVD, and a MD.

While the present invention has been described with respect to the specific embodiments, it will be apparent to those skilled in the art that various changes and modifications may be made without departing from the spirit and scope of the invention as defined in the following claims.

What is claimed is:

1. A laminated optical film comprising:
  a first retardation film including a stretched homo polypropylene resin having an isotactic index more than 85 percent, wherein the homo polypropylene resin has a melt flow rate in the range of 1 to 15 g/10 min and where at least the first retardation film is made by stretching an unstretched film, the unstretched film is made by melting, mixing, and extruding the homo polypropylene resin, and quickly casting the homo polypropylene resin by a cast drum where the cast drum has a surface temperature in the range of 5 to 35 degrees Celsius, and
  wherein a value subtracting an average in-plane retardation value of the retardation film from the in-plane retardation value at the retardation film is in a range of ±5 nm, wherein the in-plane retardation value is defined by the following:

$$Re=(Nx-Ny)*D \qquad \text{[Formula 1]}$$

where Nx is a refractive index in a direction of an axis representing a maximum refractive index, Ny is a refractive index of a direction perpendicular to the axis, and D is a thickness (nm) of the retardation film, and
  wherein the retardation film has a zero wavelength dispersibility where a retardation value increases or decreases as a wavelength of a transmitted light is longer, the zero wavelength dispersibility having a maximum or minimum wavelength dispersibility ratio in a range of 1±0.1, wherein the wavelength dispersibility ratio is defined by the following formula:

$$\text{Wavelength Dispersibility Ratio}=Re/Re(550) \qquad \text{[Formula 2]}$$

where Re is an in-plane retardation value in the wavelength of a visible region (400 nm to 800 nm) and Re(550) is an in-plane retardation value at the wavelength of 550 nm; and
  a second retardation film laminated on the first retardation film,
  wherein the second retardation film has a negative wavelength dispersibility where a retardation value decreases as a wavelength of a transmitted light is longer, the negative wavelength dispersibility having a maximum or minimum wavelength dispersibility ratio beyond a range of 1±0.1, and
  wherein the laminated retardation film has a positive wavelength dispersibility where a retardation value increases as the wavelength of a transmitted light is longer, the positive wavelength dispersibility having a maximum or minimum wavelength dispersibility ratio beyond a range of 1±0.1,
  wherein the wavelength dispersibility ratio is defined by Formula 2.

2. The laminated optical film of claim 1, wherein an angle between a machine direction of the first retardation film and a retardation axis of the second retardation film is in a range of 20-40 degrees.

3. The laminated optical film of claim 1, wherein the stretched homo polypropylene resin has an isotactic index more than 90 percent.

4. The laminated optical film of claim 1, the polypropylene a plurality of uniformly sized spherulite.

5. The laminated optical film of claim 1, wherein the homo polypropylene resin has a melt flow rate in the range of 2 to 10 g/10 min.

6. The laminated optical film of claim 1, wherein the laminated optical film exhibits the positive wavelength dispersibility over a visible region of wavelengths in the range of 400 nm to 800 nm.

* * * * *